United States Patent
Umeyama et al.

(10) Patent No.: US 10,050,256 B2
(45) Date of Patent: Aug. 14, 2018

(54) METHOD OF MANUFACTURING POSITIVE ELECTRODE FOR LITHIUM ION SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Naoyuki Wada, Hirakata (JP); Tatsuya Hashimoto, Osaka (JP); Naoto Onodera, Izumisano (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 168 days.

(21) Appl. No.: 14/946,341

(22) Filed: Nov. 19, 2015

(65) Prior Publication Data
US 2016/0156016 A1    Jun. 2, 2016

(30) Foreign Application Priority Data

Nov. 27, 2014  (JP) ................. 2014-240015

(51) Int. Cl.
| H01M 4/04 | (2006.01) |
| H01M 4/13 | (2010.01) |
| H01M 10/05 | (2010.01) |
| H01M 4/66 | (2006.01) |
| H01M 4/139 | (2010.01) |
| H01M 10/0525 | (2010.01) |

(52) U.S. Cl.
CPC ......... *H01M 4/0435* (2013.01); *H01M 4/139* (2013.01); *H01M 4/661* (2013.01); *H01M 10/0525* (2013.01)

(58) Field of Classification Search
CPC ............. H01M 4/0404; H01M 4/043; H01M 4/0433–4/0435
See application file for complete search history.

(56) References Cited

U.S. PATENT DOCUMENTS

| 2006/0134521 A1 | 6/2006 | Shima |
| 2010/0068627 A1 | 3/2010 | Muraoka et al. |
| (Continued) |

FOREIGN PATENT DOCUMENTS

| CN | 102150302 A | 8/2011 |
| CN | 103907226 A | 7/2014 |
| (Continued) |

*Primary Examiner* — Matthew J Merkling
(74) *Attorney, Agent, or Firm* — Sughrue Mion, PLLC

(57) ABSTRACT

A method of manufacturing a positive electrode includes: preparing a current collector foil having a first main surface and a second main surface; obtaining a granulated body in which a solvent remains by mixing a positive electrode active material, a conductive material, a binder, and the solvent with each other to obtain a mixture and granulating the mixture; obtaining a first positive electrode mixture layer by pressing the granulated body into a sheet shape; arranging the first positive electrode mixture layer on the first main surface; and heating the current collector foil in a state where the first positive electrode mixture layer is arranged on the first main surface, such that a temperature of the current collector foil becomes a softening point of the current collector foil or higher and that a temperature of the first positive electrode mixture layer is lower than a melting point of the binder.

7 Claims, 8 Drawing Sheets

(56) References Cited

U.S. PATENT DOCUMENTS

| | | | |
|---|---|---|---|
| 2011/0045360 A1* | 2/2011 | Deguchi | H01M 4/0435 429/341 |
| 2011/0143199 A1 | 6/2011 | Muraoka et al. | |
| 2011/0244325 A1* | 10/2011 | Muraoka | H01M 4/0404 429/211 |
| 2014/0199588 A1 | 7/2014 | Shinozaki et al. | |
| 2014/0234724 A1* | 8/2014 | Nakamura | H01M 4/1393 429/232 |
| 2014/0342225 A1 | 11/2014 | Isshiki et al. | |
| 2015/0280206 A1* | 10/2015 | Schroedle | H01M 4/0404 29/17.2 |
| 2015/0280208 A1* | 10/2015 | Kimura | H01M 4/0435 429/217 |

FOREIGN PATENT DOCUMENTS

| | | | |
|---|---|---|---|
| JP | 2005123180 A | 5/2005 | |
| JP | 2009-064770 A | 3/2009 | |
| JP | 2013077560 A | 4/2013 | |
| KR | 1020110049847 A | 5/2011 | |
| WO | 2013/002279 A1 | 1/2013 | |

* cited by examiner

FIG. 9

| SAMPLE | POSITIVE ELECTRODE PREPARATION STEP ||||||| POSITIVE ELECTRODE ||| BATTERY ||||
| | MATERIAL OF CURRENT COLLECTOR FOIL | TAP DENSITY OF POSITIVE ELECTRODE ACTIVE MATERIAL | FIRST POSITIVE ELECTRODE MIXTURE LAYER | HEAT ROLLER || HOT AIR DRYING FURNACE | CURRENT COLLECTOR FOIL | | POSITIVE ELECTRODE MIXTURE LAYER | INITIAL || AFTER HIGH-RATE CYCLES |
| | | | | TEMPE-RATURE | CONTACT TIME | HOT AIR DRYING TEMPE-RATURE | PERCENTAGE ELONGATION AFTER FRACTURE | | MI | | LOW-TEMPERATURE RESISTANCE | LOW-TEMPERATURE RESISTANCE |
| | — | g/cm³ | — | °C | sec | °C | % | | — | | Ω | Ω |
| A1 | A8021 | 1.5 | GRANULATED BODY | 180 | 2 | 150 | 5.5 | | 0.8 | | 8.9 | 9.7 |
| A2 | A8021 | 1.5 | GRANULATED BODY | 200 | 1 | 150 | 5.9 | | 0.8 | | 8.7 | 9.6 |
| A3 | A8021 | 1.5 | GRANULATED BODY | 250 | 0.4 | 150 | 6.5 | | 1.2 | | 8.7 | 9.6 |
| A4 | A8021 | 1.5 | GRANULATED BODY | 300 | 0.2 | 150 | 6.9 | | 0.7 | | 8.9 | 9.6 |
| A5 | A8021 | 1.5 | GRANULATED BODY | 350 | 0.1 | 150 | 7.1 | | 1.1 | | 8.8 | 9.5 |
| A6 | A8021 | 1.5 | GRANULATED BODY | 400 | 0.05 | 150 | 7.3 | | 0.9 | | 8.7 | 9.4 |
| A7 | A8021 | 1.2 | GRANULATED BODY | 300 | 0.2 | 150 | 6.7 | | 1.0 | | 8.6 | 9.1 |
| A8 | A8021 | 1.9 | GRANULATED BODY | 300 | 0.2 | 150 | 7.4 | | 1.3 | | 9.0 | 9.8 |
| A9 | A8021 | 2.2 | GRANULATED BODY | 300 | 0.2 | 150 | 7.5 | | 0.9 | | 9.4 | 13.6 |
| A10 | A1085 | 1.5 | GRANULATED BODY | 300 | 0.4 | 150 | 5.5 | | 1.1 | | 9.2 | 9.9 |
| B1 | A1085 | 1.5 | GRANULATED BODY | 300 | 0.2 | 150 | 1.8 | | 1.2 | | 8.8 | 18.0 |
| B2 | A8021 | 1.5 | GRANULATED BODY | 160 | 2 | 150 | 1.9 | | 0.9 | | 8.8 | 17.3 |
| B3 | A8021 | 1.5 | GRANULATED BODY | NONE | — | 150 | 1.6 | | 1.2 | | 8.9 | 18.2 |
| B4 | A8021 | 1.5 | GRANULATED BODY | 400 | 2 | 150 | 7.6 | | 1.1 | | 13.2 | 14.2 |
| B5 | A8021 | 1.5 | GRANULATED BODY | NONE | — | 250 | 7.7 | | 1.0 | | 14.6 | 15.4 |
| B6 | A8021 | 1.5 | SLURRY COATING FILM | 300 | 0.2 | 150 | 6.7 | | 1.7 | | 8.8 | 14.4 |

METHOD OF MANUFACTURING POSITIVE ELECTRODE FOR LITHIUM ION SECONDARY BATTERY

INCORPORATION BY REFERENCE

The disclosure of Japanese Patent Application No. 2014-240015 filed on Nov. 27, 2014 including the specification, drawings and abstract is incorporated herein by reference in its entirety.

BACKGROUND OF THE INVENTION

1. Field of the Invention

The present invention relates to a method of manufacturing a positive electrode for a lithium ion secondary battery.

2. Description of Related Art

Japanese Patent Application Publication No. 2009-064770 (JP 2009-064770 A) discloses a method of manufacturing a nonaqueous electrolyte secondary battery, in which a heat treatment is performed on a positive electrode current collector foil and a positive electrode mixture after the positive electrode mixture is applied to the positive electrode current collector foil and dried.

In JP 2009-064770 A, the current collector foil is softened in order to improve safety in a crushing test. Specifically, the heat treatment is performed to soften the current collector foil after the positive electrode mixture is applied to the current collector foil and dried to form a positive electrode mixture layer. However, according to this method, the positive electrode mixture layer and the current collector foil undergo the heat treatment at the same temperature. As a result, a binder contained in the positive electrode mixture layer is melted, and resistance increases.

The reason why the soft current collector foil is not used from the beginning is that it is difficult to accurately form the positive electrode mixture layer on the soft current collector foil that is easy to deform.

SUMMARY OF THE INVENTION

The present invention provides a method of manufacturing a positive electrode for a lithium ion secondary battery, capable of softening a current collector foil and suppressing an increase in resistance at the same time.

An aspect of the present invention is a method of manufacturing a positive electrode for a lithium ion secondary battery. The method includes: preparing a current collector foil having a first main surface and a second main surface that are opposite sides of the current collector foil; obtaining a granulated body in which a solvent remains by mixing a positive electrode active material, a conductive material, a binder, and the solvent with each other to obtain a mixture and granulating the mixture; obtaining a first positive electrode mixture layer by pressing the granulated body into a sheet shape; arranging the first positive electrode mixture layer on the first main surface; and heating the current collector foil in a state where the first positive electrode mixture layer containing the granulated body is arranged on the first main surface, such that a temperature of the current collector foil becomes a softening point of the current collector foil or higher and that a temperature of the first positive electrode mixture layer is lower than a melting point of the binder.

In the above-described manufacturing method, the current collector foil is heated to a softening point or higher in a state where the first positive electrode mixture layer is arranged on the first main surface of the current collector foil. As a result, the current collector foil is softened. At this time, the current collector foil is supported by the first positive electrode mixture layer. Therefore, a decrease in productivity caused by the softening of the current collector foil is suppressed.

In addition, the current collector foil is heated such that the temperature of the first positive electrode mixture layer is lower than the melting point of the binder. As a result, the melting of the binder is suppressed. For example, using heating means such as a heat roller or induction heating described below, the current collector foil can be locally heated, and an increase in the temperature of the first positive electrode mixture layer can be suppressed. According to the above-described manufacturing method, during the heating of the current collector foil, the first positive electrode mixture layer is not dried and is wet because it contains the granulated body in which the solvent remains. Therefore, heat applied to the current collector foil is consumed as vaporization heat of the solvent contained in the first positive electrode mixture layer, and an increase in the temperature of the first positive electrode mixture layer is suppressed. Accordingly, in the above-described manufacturing method, the temperature of the first positive electrode mixture layer can be controlled to be lower than the melting point of the binder.

In the above-described manufacturing method, a granulated body is used as the positive electrode mixture instead of a slurry. The granulated body is an aggregate of wet granulated particles. In the granulated body, the amount of the solvent is less than that in the slurry. By pressing the granulated body into a sheet shape, an independent positive electrode mixture layer is formed. This positive electrode mixture layer can support the current collector foil more strongly than a coating film formed of a slurry. When the current collector foil is heated in a state where the slurry is applied to the current collector foil, it is considered that binder migration becomes severe, and resistance increases. Accordingly, in the above-described manufacturing method, the mixture layer is formed of the granulated body.

A positive electrode for a lithium ion secondary battery (hereinafter, also referred to as "positive electrode") is manufactured, the positive electrode including: the current collector foil that is softened as described above; and the positive electrode mixture layer that is formed on the current collector foil and in which the melting of the binder is suppressed as described above. According to this positive electrode, the current collector foil can be softened, and concurrently an increase in resistance can be suppressed.

In the aspect of the present invention, the current collector foil may be an aluminum alloy foil containing from 1.2 mass % to 1.7 mass % of iron.

The above-described aluminum (Al) alloy foil has a lower softening point than other Al alloy foils or a pure Al foil. Accordingly, the amount of heat in the heating step can be reduced. As a result, the amount of heat applied to the binder can be reduced.

In the aspect of the present invention, a heated roller and the second main surface may be brought into contact with each other during the heating of the current collector foil.

In the above-described aspect, the current collector foil can be directly heated. In addition, the first positive electrode mixture layer arranged on the first main surface is not directly heated. Accordingly, the amount of heat applied to the binder can be reduced. Hereinafter, the heated roller will also be referred to as "heat roller."

In the aspect of the present invention, a temperature of the roller may be from 200° C. to 400° C. during the heating of the current collector foil.

By setting the temperature of the roller to be within the above-described temperature range, the current collector foil can be easily softened.

In the aspect of the present invention, a contact time between the roller and the second main surface may be from 0.05 seconds to 2.0 seconds during the heating of the current collector foil.

Since the heat roller has high heat transfer efficiency, the current collector foil can be softened within a short period of time. By setting the contact time to be short, the melting of the binder can be suppressed.

In the aspect of the present invention, a tap density of the positive electrode active material may be from 1.2 $g/cm^3$ to 1.9 $g/cm^3$.

By suppressing the tap density to be 1.9 $g/cm^3$ or less, the first positive electrode mixture layer is not likely to be dried during the heating of the current collector foil. By setting the tap density to be 1.2 $g/cm^3$ or more, the density of the first positive electrode mixture layer can be increased.

The method according to the aspect of the present invention may further include arranging a second positive electrode mixture layer on the second main surface after the heating of the current collector foil.

According to the above-described manufacturing method, the softened current collector foil is supported by the first positive electrode mixture layer. Accordingly, the second positive electrode mixture layer can be accurately formed and arranged on the second main surface. As a result, a positive electrode can be manufactured in which the positive electrode mixture layer is formed on both of the main surfaces of the current collector foil.

According to the aspects of the present invention, it is possible to provide a method of manufacturing a positive electrode for a lithium ion secondary battery, capable of softening a current collector foil and suppressing an increase in resistance at the same time.

BRIEF DESCRIPTION OF THE DRAWINGS

Features, advantages, and technical and industrial significance of exemplary embodiments of the present invention will be described below with reference to the accompanying drawings, in which like numerals denote like elements, and wherein:

FIG. 9 is a table showing preparation conditions of positive electrodes according to respective samples, experiment results of the positive electrodes according to the respective samples, and the experiment results of batteries prepared using the positive electrodes according to the respective samples.

DETAILED DESCRIPTION OF EMBODIMENTS

Hereinafter, an embodiment of the present invention (hereinafter, referred to as "the embodiment") will be described. However, the embodiment is not limited to the following description.

Figure 1:
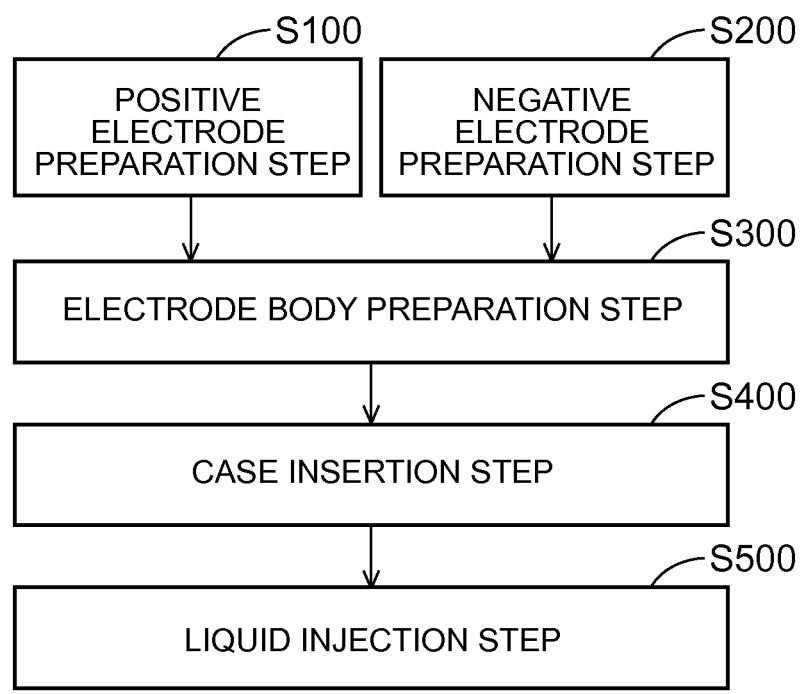
FIG. 1 is a flowchart showing the summary of a method of manufacturing a lithium ion secondary battery according to an embodiment of the present invention.

FIG. 1 is a flowchart showing the summary of a method of manufacturing a lithium ion secondary battery according to the embodiment. As shown in FIG. 1, the manufacturing method includes a positive electrode preparation step S100, a negative electrode preparation step S200, an electrode body preparation step S300, a case insertion step S400, and a liquid injection step S500. Hereinafter, each step will be described.

Figure 3:
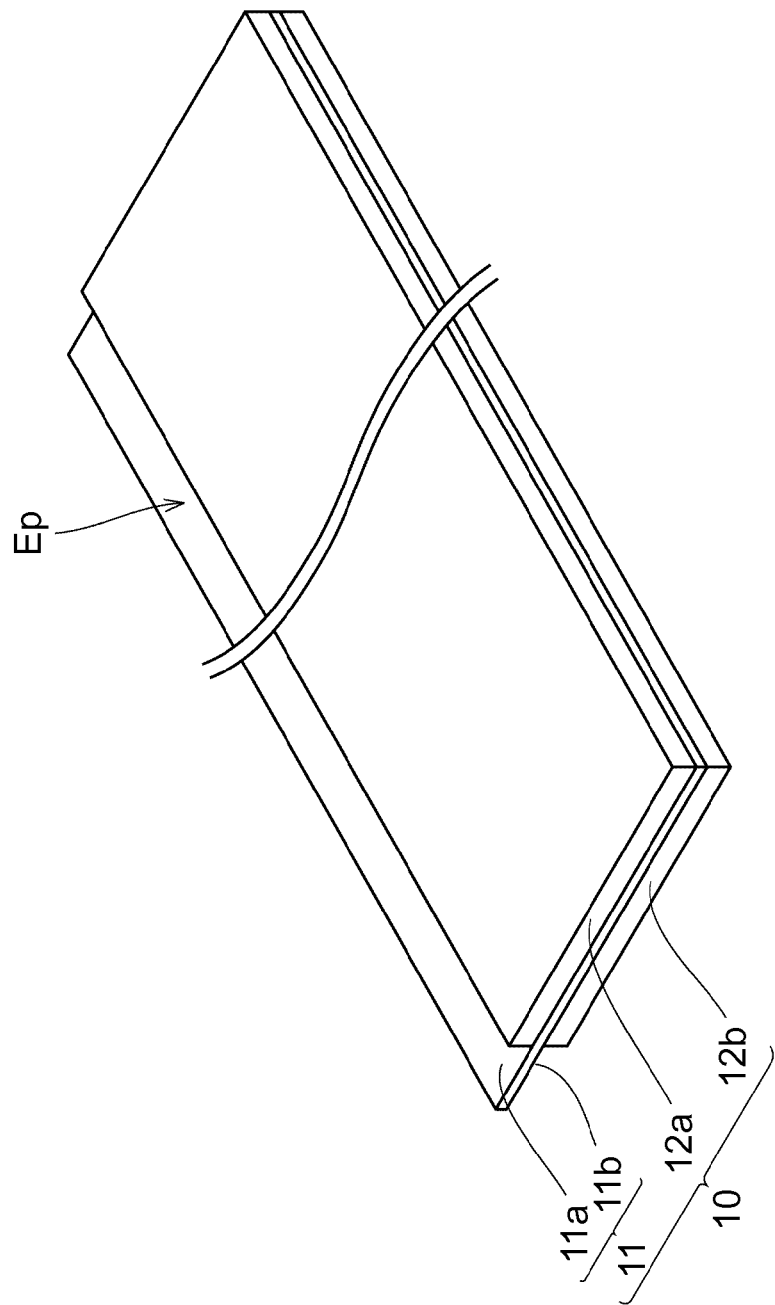
FIG. 3 is a schematic diagram showing a configuration example of a positive electrode according to the embodiment of the present invention.

In the positive electrode preparation step S100, a positive electrode 10 shown in FIG. 3 is prepared. The positive electrode 10 is an elongated belt-shaped sheet member. The positive electrode 10 includes: a current collector foil 11 having a first main surface 11a and a second main surface 11b, the first main surface 11a and the second main surface 11b being opposite sides of the current collector foil; a first positive electrode mixture layer 12a that is arranged on the first main surface 11a; and a second positive electrode mixture layer 12b that is arranged on the second main surface 11b. The positive electrode 10 includes an exposure portion Ep where the current collector foil 11 is exposed. The exposure portion Ep is provided for connection to an external terminal.

Figure 2:
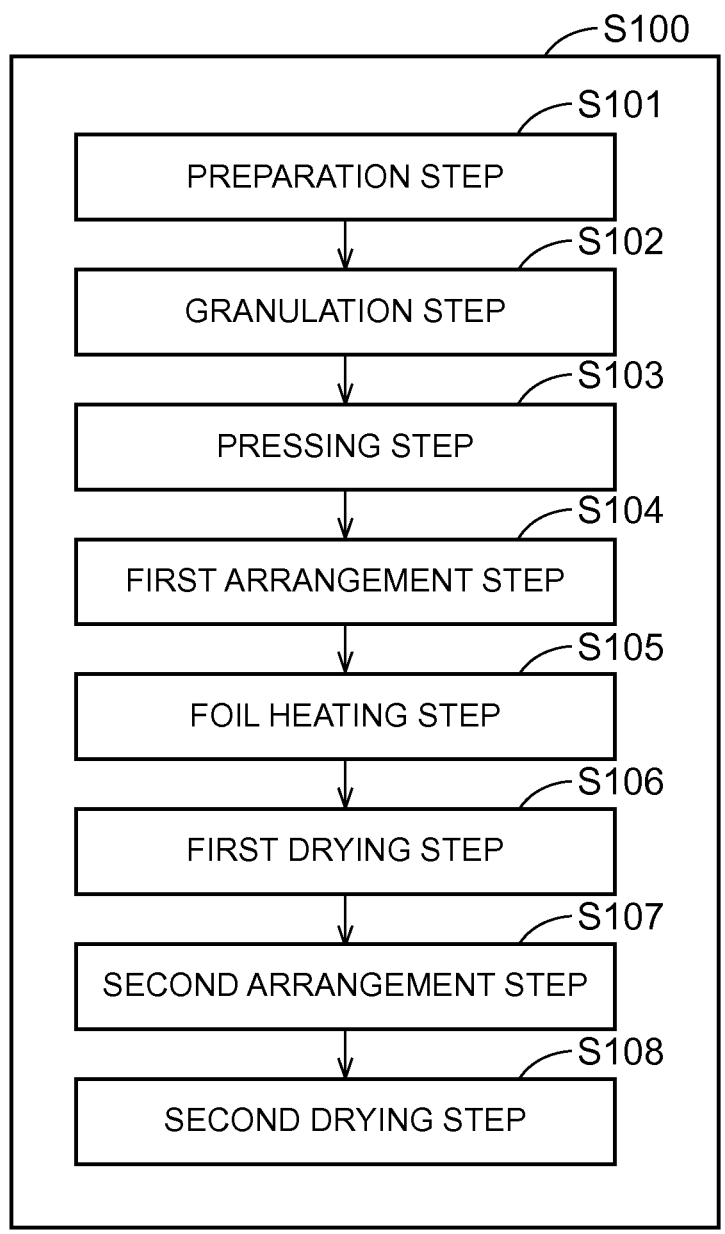
FIG. 2 is a flowchart showing the summary of a method of manufacturing a positive electrode for a lithium ion secondary battery according to the embodiment of the present invention.

FIG. 2 is a flowchart showing the summary of the positive electrode preparation step S100. As shown in FIG. 2, the positive electrode preparation step S100, that is, the method of manufacturing a positive electrode for a lithium ion secondary battery includes a preparation step S101, a granulation step S102, a pressing step S103, a first arrangement step S104, a foil heating step S105, a first drying step S106, a second arrangement step S107, and a second drying step S108. The respective steps are performed in this order. The first arrangement step S104 and the foil heating step S105 may be simultaneously performed. When simultaneously performed, the steps can be simplified.

In the preparation step S101, the current collector foil 11 shown in FIG. 3 having the first main surface 11a and the second main surface 11b is prepared, the first main surface 11a and the second main surface 11b being opposite sides of the current collector foil 11. Examples of the current collector foil according to the embodiment includes: a pure metal foil that is formed of a single metal element; and an alloy foil that is formed of plural metal elements. The current collector foil may contain impurities other than the metal elements which are unavoidably incorporated during the manufacturing process. In consideration of mechanical characteristics and corrosion resistance, it is preferable that the current collector foil is a pure Al foil or an Al alloy foil. When heated to a softening point or higher, the current collector foil is softened. "Softening point" described herein refers to a temperature at which at least one of the elimination of point defects in crystals and the rearrangement of dislocations starts in a metal material. Even when the current collector foil is heated at a temperature lower than the softening point, the softening of the current collector foil is not severe.

The softening point of the current collector foil varies depending on the kind of the metal element, processing history, and the like. The softening point of the pure Al foil is about 200° C. to 300° C. The softening point of the Al alloy foil varies depending on the constituent element and the addition amount thereof. Accordingly, by selecting an alloy composition having a low softening point, the amount of heat required for softening can be reduced. For example, an Al alloy foil containing from 1.2 mass % to 1.7 mass % of iron (Fe) and 97.9 mass % or higher of Al is preferable. This Al alloy foil is called a low-temperature softening Al foil. The softening point of the low-temperature softening Al foil is lower than 200° C. (for example, about 160° C.).

The thickness of the current collector foil 11 is preferably from 3 µm to 30 µm, more preferably from 5 µm to 25 µm, and still more preferably from 5 µm to 20 µm. At this time, it is preferable that the current collector foil 11 is not softened. This is because, when a soft current collector foil is used from the beginning, productivity decreases. From this point of view, the percentage elongation after fracture of the current collector foil 11 at this time is preferably 3.0% or lower.

Here, "percentage elongation after fracture" refers to a value which is measured and calculated according to "JIS Z 2241: 2011 metal material tensile testing method." "JIS Z 2241" is defined by Japanese Industrial Standards. In "JIS Z 2241: metal material tensile testing method", percentage elongation after fracture is defined as a ratio (by percentage) of a percentage permanent elongation after fracture to an original gauge length $L_0$. The gauge length refers to the length on which where the elongation is measured in a parallel portion of a test piece. The original gauge length $L_0$ refers to the gauge length of the test piece which has been measured at room temperature before the test, and is specified on the test piece. The percentage permanent elongation refers to the increase in the original gauge length $L_0$ after removal of predetermined stress, expressed as a percentage of the original gauge length $L_0$. The percentage permanent elongation after fracture is a value ($L_u$–$L_0$) which is obtained by subtracting the original gauge length $L_0$ from a final gauge length after fracture $L_u$. The final gauge length after fracture refers to the gauge length of the test piece which has been measured at room temperature after fracture, and is specified in the test piece. The final gauge length after fracture $L_u$ is measured after two fractured test pieces are fitted together such that their axes lie in a straight line.

In the granulation step S102, a granulated body is prepared. The granulated body is an aggregate of granulated particles. The granulated body can be prepared by mixing a positive electrode active material, a conductive material, a binder, and a solvent with each other. A granulation method is not particularly limited. For example, using a general mixer, the above materials may be mixed with each other at a predetermined solid content proportion. For example, the mixer may be a planetary mixer. The solid content proportion of the granulated body may be from 65 mass % to 80 mass %. A positive electrode mixture layer formed of the granulated body is homogeneous and can stably support the current collector foil. In addition, since the solvent remains in the granulated body, an increase in the temperature of the first positive electrode mixture layer 12a in the foil heating step S105 can be suppressed. The lower limit of the solid content proportion of the granulated body may be 70 mass %, and the upper limit thereof may be 75 mass %. As the solvent, for example, N-methyl-2-pyrrolidone (NMP) can be used.

The proportion of the positive electrode active material in the solid content of the granulated body is, for example, from 85 mass % to 97 mass %, and is preferably from 87 mass % to 95 mass % and more preferably from 89 mass % to 93 mass %. As the positive electrode active material, any material which can function as a positive electrode active material of a lithium ion secondary battery can be used. For example, powder of a Li-containing compound such as $LiCoO_2$, $LiNiO_2$, $LiNi_aCo_bO_2$ (wherein, a+b=1, 0<a<1, and 0<b<1), $LiMnO_2$, $LiMn_2O_4$, $LiNi_aCo_bMn_cO_2$ (wherein, a+b+c=1, 0<a<1, 0<b<1, and 0<c<1), or $LiFePO_4$ can be used. The powder of the positive electrode active material may contain hollow particles. The hollow particles are particles having one or more cavities therein. By the positive electrode active material containing the hollow particles, the solvent is likely to remain in the cavities. As a result, an increase in the temperature of the first positive electrode mixture layer 12a in the foil heating step S105 can be suppressed. The positive electrode active material containing the hollow particles can be verified by observing a section of the first positive electrode mixture layer 12a using a scanning electron microscope (SEM). The proportion of the hollow particles in the powder of the positive electrode active material may be 5% or higher, 50% or higher, or 80% or higher.

The tap density of the powder of the positive electrode active material may be from 1.2 $g/cm^3$ to 1.9 $g/cm^3$. According to the study by the present inventors, as the tap density of the positive electrode active material increases, the positive electrode mixture layer in the foil heating step S105 is more easily dried. By suppressing the tap density to be 1.9 $g/cm^3$ or lower, an increase in the temperature of the first positive electrode mixture layer 12a in the foil heating step S105 can be suppressed. On the other hand, by adjusting the tap density to be 1.2 $g/cm^3$ or higher, the mixture density of the positive electrode mixture layer can be increased. The lower limit of the tap density of the positive electrode active material may be 1.3 $g/cm^3$ or 1.4 $g/cm^3$. The upper limit of the tap density may be 1.8 $g/cm^3$ or 1.7 $g/cm^3$.

As the conductive material, for example, acetylene black (AB) or graphite can be used. The proportion of the conductive material in the solid content of the granulated body is, for example, from 1 mass % to 10 mass %, and is preferably from 3 mass % to 10 mass % and more preferably from 5 mass % to 10 mass %. As the binder, for example, polyvinylidene fluoride (PVDF) or polytetrafluoroethylene (PTFE) can be used. The proportion of the binder in the solid content of the granulated body is, for example, from 1 mass % to 10 mass %, and is preferably from 1 mass % to 8 mass % and more preferably from 1 mass % to 5 mass %.

In the pressing step S103, the first positive electrode mixture layer 12a is prepared by pressing the granulated body into a sheet shape.

Figure 4:
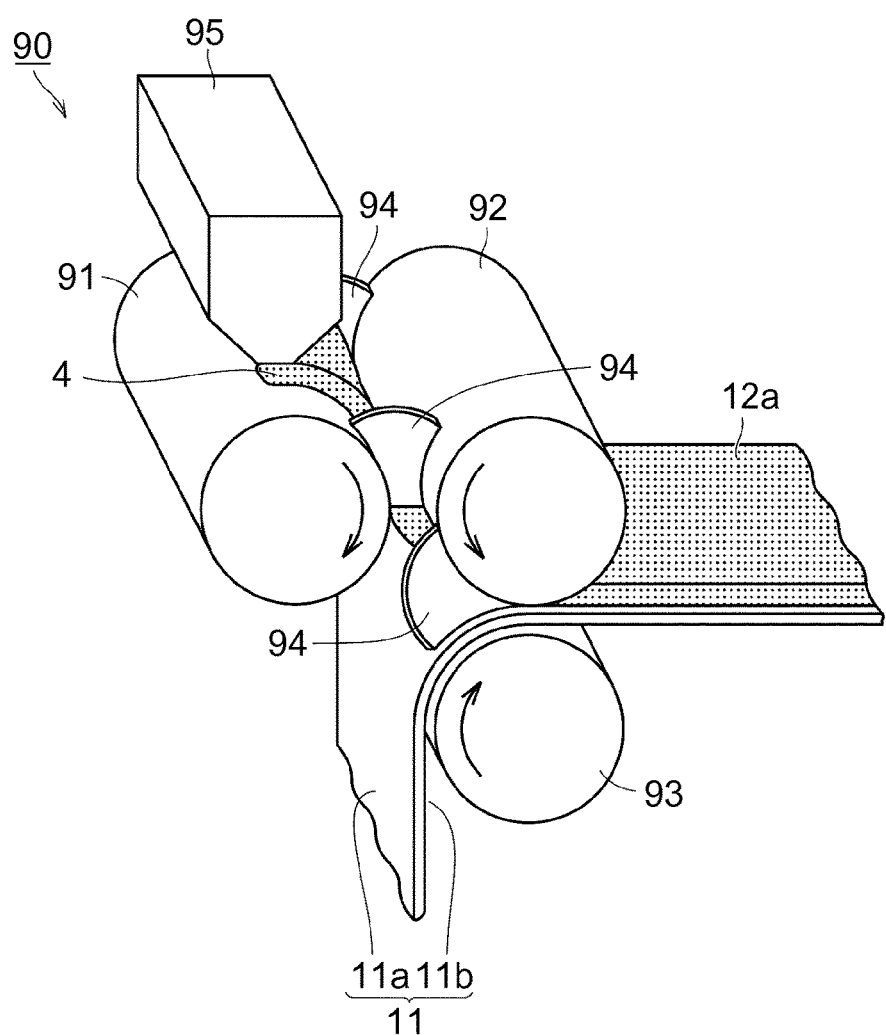
FIG. 4 is a schematic diagram showing a pressing step, a first arrangement step, and a foil heating step according to the embodiment of the present invention.

FIG. 4 is a schematic diagram showing the pressing step S103, and the first arrangement step S104 and the foil heating step S105 described below. The granulated body 4 obtained in the granulation step S102 is supplied to a feeder 95 of an electrode preparation device 90 shown in FIG. 4. The granulated body 4 is supplied from the feeder 95 onto an A roller 91. In FIG. 4, arrows indicate rotating directions of the respective roller members. The granulated body 4 is transported along the A roller 91 in the arrow direction and reaches a gap between the A roller 91 and a B roller 92. In the gap, pressure is applied from the A roller 91 and the B roller 92 to the granulated body 4 such that the granulated body 4 is formed into a sheet shaped first positive electrode mixture layer 12a. The width of the first positive electrode mixture layer 12a is adjusted by partition members 94. The coating weight (mass per unit area) of the first positive electrode mixture layer 12a is adjusted by the gap between the A roller 91 and the B roller 92.

In the first arrangement step S104, the first positive electrode mixture layer 12a is arranged on the first main surface 11a of the current collector foil 11. As shown in FIG. 4, the first positive electrode mixture layer 12a which has been formed into a sheet shape is transported along the B roller 92 in the arrow direction. The current collector foil 11 is transported along a C roller 93 in the arrow direction. In the gap between the B roller 92 and the C roller 93, pressure is applied from the B roller 92 and the C roller 93 to the first positive electrode mixture layer 12a and the current collector foil 11 such that the first positive electrode mixture layer 12a is transferred from the B roller 92 to a predetermined position on the first main surface 11a. Concurrently, the first positive electrode mixture layer 12a is pressure-bonded to the first main surface 11a.

In the electrode preparation device 90 shown in FIG. 4, the first arrangement step S104 and the foil heating step S105 are simultaneously performed. That is, the C roller 93 contacting the second main surface 11b of the current collector foil 11 is a heat roller which is heated to a predetermined temperature. As a result, the current collector foil 11 is heated through the second main surface 11b such that current collector foil 11 softened. At this time, the first positive electrode mixture layer 12a has already been arranged on at least a part of the first main surface 11a, and the current collector foil 11 is supported by the first positive electrode mixture layer 12a. As a result, even when the current collector foil 11 is softened, the current collector foil 11 and the first positive electrode mixture layer 12a can be stably transported on the subsequent pass line.

According to this method, heat is not directly applied to the first positive electrode mixture layer 12a arranged on the first main surface 11a. Further, the first positive electrode mixture layer 12a is wet. Therefore, heat transferred to the first positive electrode mixture layer 12a through the current collector foil 11 is consumed as vaporization heat of the solvent contained in the first positive electrode mixture layer 12a. An increase in the temperature of the first positive electrode mixture layer 12a is suppressed. As a result, the temperature of the first positive electrode mixture layer 12a can be controlled to be lower than the melting point of the binder.

Here, "melting point of the binder" refers to a peak top temperature in differential scanning calorimetry (DSC) according to "JIS K 7121:2012 Testing methods for transition temperatures of plastics." "JIS K 7121" is defined by Japanese Industrial Standards. Specifically, DSC includes power compensation differential scanning calorimetry (power compensation DSC) and heat flux differential scanning calorimetry (heat flux DSC). In the power compensation DSC, a difference between input heat energy values, which are applied to a test piece and a reference material per unit time such that the temperatures of the test piece and the reference material are the same, is measured as a function of temperature while changing the temperatures of the test piece and the reference material according to adjusted program. In the heat flux DSC, a difference in temperature between a test piece and a reference material is measured as a temperature function while changing the temperatures of the test piece and the reference material according to adjusted program. In the heat flux DSC, a difference in temperature between a test piece and a reference material is in proportion to a difference between the input values of heat energy per unit time.

The temperature of the heat roller and the contact time between the heat roller and the current collector foil 11 are adjusted such that the current collector foil 11 is heated to a softening point or higher and that the temperature of the first positive electrode mixture layer 12a is lower than the melting point of the binder. Although depending on the molecular weight or the like, the melting point of PVDF which is used as a binder of a battery is about 170° C. Therefore, in this case, the temperature of the first positive electrode mixture layer 12a is adjusted to be lower than 170° C.

When the current collector foil 11 is a pure Al foil or an Al alloy foil, the temperature of the heat roller is preferably from 200° C. to 400° C. Within the above-described temperature range, the current collector foil 11 can be heated to a softening point or higher through contact within a short period of time. The lower limit of the temperature of the heat roller may be 250° C., and the upper limit thereof may be 350° C. The contact time can be adjusted by the rotating speed, diameter, and the like of the roller. The contact time is preferably from 0.05 seconds to 2.0 seconds. As a result, the amount of heat applied to the first positive electrode mixture layer 12a can be reduced. The lower limit of the contact time may be 0.1 seconds or 0.2 seconds. The upper limit of the contact time may be 1.0 second or 0.4 seconds.

The percentage elongation after fracture of the current collector foil 11 which has undergone the foil heating step S105 is preferably from 5.5% to 7.5%. The current collector foil having a percentage elongation after fracture of 5.5% or higher can withstand the expansion and shrinkage of the positive electrode mixture layer in the battery. The current collector foil having a percentage elongation after fracture of 7.5% or lower is easy to handle after being softened. The lower limit of the percentage elongation after fracture of the current collector foil which has undergone the foil heating step S105 may be 5.9% or 6.5%. The upper limit of the percentage elongation after fracture of the current collector foil which has undergone the foil heating step S105 may be 7.4% or 7.3%.

The foil heating step S105 and the first arrangement step S104 may not be simultaneously performed as long as the steps are performed in a state where the first positive electrode mixture layer 12a is arranged on the first main surface 11a. For example, the following configuration may be adopted in which, instead of using a heat roller as the C roller 93, a heat roller is separately provided on a pass line after the C roller 93 so as to bring the second main surface 11b and the heat roller into contact with each other.

In the foil heating step S105, heating means is not limited to the heat roller. However, it is preferable that heating means is used in which heat can be directly applied to the current collector foil 11 substantially without heat being applied to the first positive electrode mixture layer 12a. For example, the current collector foil can be heated by induction heating. The frequency of the induction heating may be appropriately adjusted according to the metal forming the current collector foil. According to the induction heating, the current collector foil itself can generate heat without contact. As a result, as in the case of the heat roller, an increase in the temperature of the first positive electrode mixture layer 12a can be suppressed.

After the foil heating step S105, in the first drying step S106, the first positive electrode mixture layer 12a is dried in a hot air drying furnace (not shown).

In the second arrangement step S107, the second positive electrode mixture layer 12b is arranged on the second main surface 11b of the current collector foil 11. The second positive electrode mixture layer 12b is manufactured using the same method as the first positive electrode mixture layer 12a, and is arranged on the second main surface 11b using the same method as the first arrangement step S104. At this time, the current collector foil 11 has already been softened but is supported by the first positive electrode mixture layer 12a. Accordingly, the second positive electrode mixture layer 12b can be accurately arranged on the second main surface 11b. However, in this step, it is preferable that the C roller 93 shown in FIG. 4 is not heated. The reason for this is as follows: in the second arrangement step S107, the first positive electrode mixture layer 12a has already been dried by being brought into contact with the C roller 93, and it is not preferable that the first positive electrode mixture layer 12a is further heated.

After the second arrangement step S107, in the second drying step S108, the second positive electrode mixture layer 12b is dried in a hot air drying furnace as in the case of the case of first positive electrode mixture layer 12a.

Next, the first positive electrode mixture layer 12a and the second positive electrode mixture layer 12b are pressed into a predetermined thickness and are cut into a predetermined dimension. In this way, the positive electrode 10 shown in FIG. 3 is completed.

In the embodiment, as described above, the positive electrode mixture layer is formed of the granulated body. As a result, binder migration is suppressed, and the diffusion of lithium ions ($Li^+$) is promoted. The positive electrode active material containing the granulated particle can be verified by observing a surface or a section of the positive electrode mixture layer using a SEM. The distribution of the binder in the thickness direction of the positive electrode mixture layer can be evaluated based on, for example, a migration index (MI).

MI can be calculated by analyzing a section of the positive electrode through scanning electron microscopy-energy dispersive X-ray spectrometry (SEM-EDX). The measurement procedure is as follows.

First, a sample for section observation is cut from the positive electrode, and a section of the sample is cleaned using, for example, a cross-section polisher. At this time, the section is not necessarily perpendicular to the surface of the positive electrode mixture layer. For example, the section may be a surface which is tilted from a surface perpendicular to the surface of the positive electrode mixture layer by about ±5°. Next, the section is analyzed by SEM-EDX. For example, when the binder is a resin such as PVDF containing fluorine (F), the mapping of F may be performed. When the binder is not a fluororesin, an element is appropriately selected as an index. In the surface analysis, the section is divided into two regions in the thickness direction including: a first region that is positioned on the current collector foil side; and a second region that is positioned on the surface of the positive electrode mixture layer. MI can be calculated by dividing an integrated value of detected intensity of F in the second region by an integrated value of detected intensity of F in the first region. When the binder is uniformly dispersed in the thickness direction of the positive electrode mixture layer, MI is close to 1.0.

In the embodiment, since the positive electrode mixture layer is formed of the granulated body, MI falls within a range of 0.7 to 1.3. On the other hand, in a positive electrode mixture layer which is formed of a slurry containing a large amount of a solvent, binder migration is significant, and MI exceeds 1.5.

Figure 5:
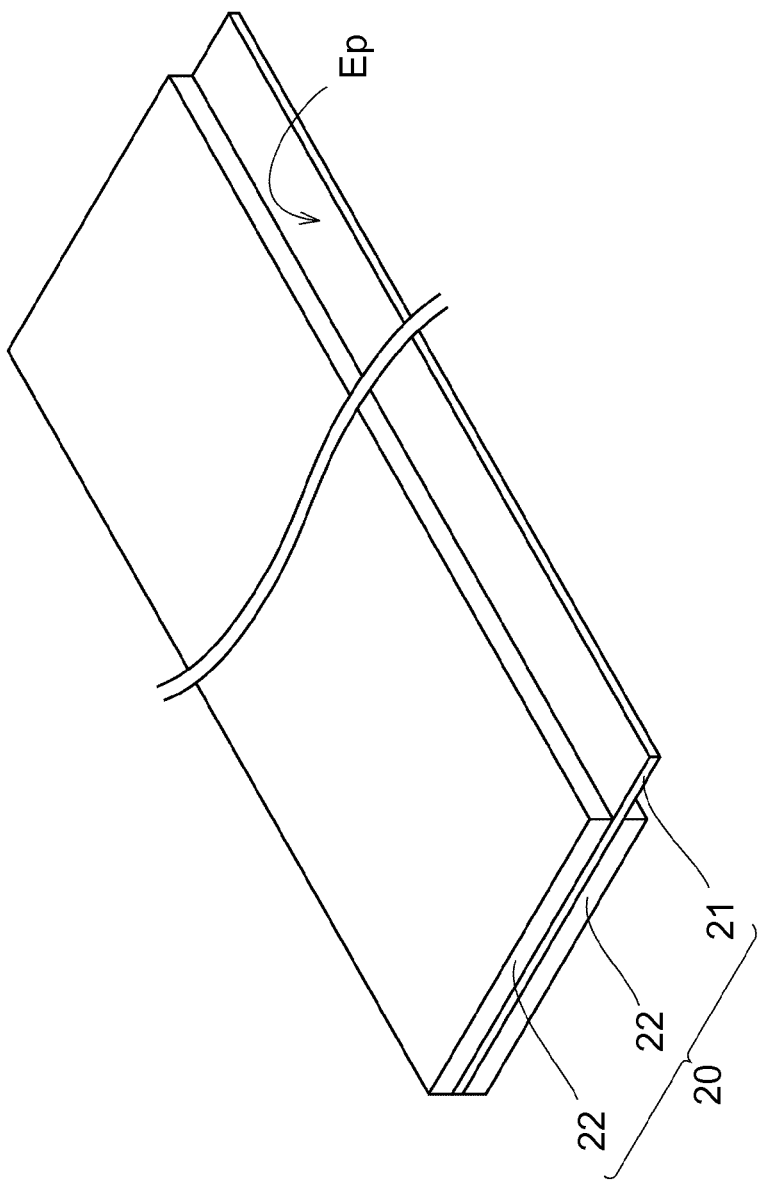
FIG. 5 is a schematic diagram showing a configuration example of a negative electrode according to the embodiment of the present invention.

In the negative electrode preparation step S200, a negative electrode 20 shown in FIG. 5 is prepared. The negative electrode 20 is an elongated belt-shaped sheet member. The negative electrode 20 includes: a negative electrode current collector foil 21; and a negative electrode mixture layer 22 that is arranged on both main surfaces of the negative electrode current collector foil 21. The negative electrode 20 includes an exposure portion Ep where the negative electrode current collector foil 21 is exposed. The exposure portion Ep is provided for connection to an external terminal. The negative electrode current collector foil 21 is, for example, copper (Cu) foil.

The negative electrode 20 can be prepared, for example, as follows. A negative electrode active material, a thickener, and a binder are kneaded with each other in water to prepare a negative electrode mixture slurry. Using a die coater or the like, the negative electrode mixture slurry is applied to a predetermined position on the negative electrode current collector foil 21. After the application, the negative electrode mixture slurry (coating film) is dried. In this way, the negative electrode mixture layer 22 can be formed. As in the case of the positive electrode mixture layer, the negative electrode mixture layer 22 may also be formed of a granulated body.

As the negative electrode active material, any material which can function as a negative electrode active material of a lithium ion secondary battery can be used. For example, a carbon negative electrode active material such as graphite or coke, or an alloy negative electrode active material of silicon (Si), tin (Sn), or the like can be used. As the thickener, for example, carboxymethyl cellulose (CMC) may be used. As the binder, for example, styrene-butadiene rubber (SRB) can be used. The composition (mass ratio; negative electrode active material:thickener:binder) of the negative electrode mixture may be, for example, about 98:1:1.

Figure 6:
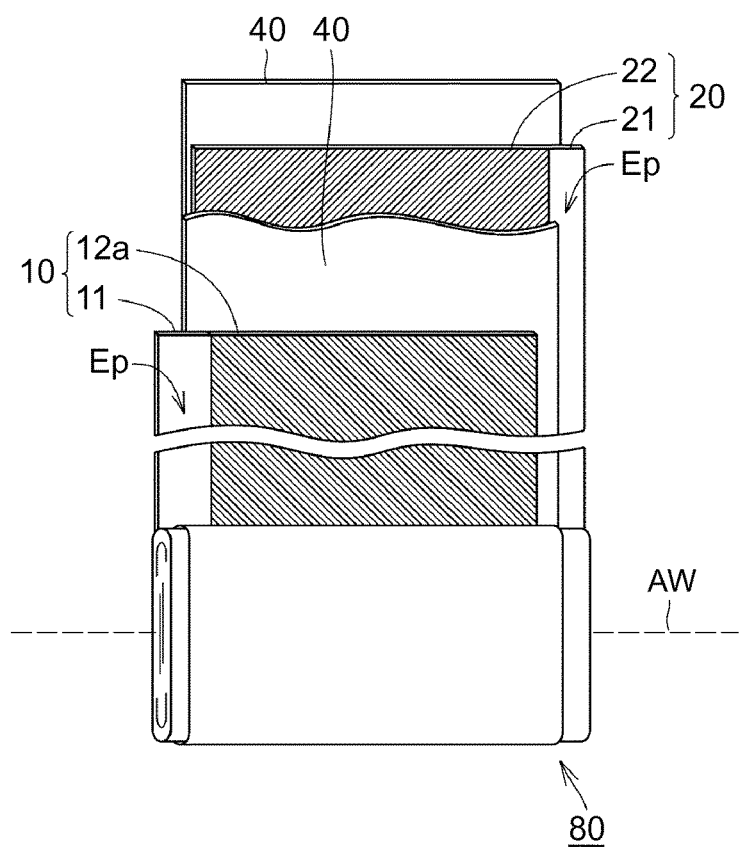
FIG. 6 is a schematic diagram showing a configuration example of an electrode body according to the embodiment of the present invention.

In the electrode body preparation step S300, an electrode body 80 is prepared. FIG. 6 is a schematic diagram showing a configuration example of the electrode body 80. As shown in FIG. 6, the electrode body 80 is prepared by arranging the positive electrode 10 and the negative electrode 20 to face each other with separators 40 interposed therebetween, and winding the components along a longitudinal direction thereof. At this time, the exposure portions Ep of the positive electrode 10 and the negative electrode 20 are arranged in opposite end portions on the winding axis AW. The electrode body 80 is wound into an elliptical shape and then pressed into a flat shape.

As the separator, for example, a microporous membrane formed of polyethylene (PE), polypropylene (PP), or the like is preferable. The thickness of the separator is, for example, 5 μm to 40 μm. The pore size and porosity of the separator may be appropriately adjusted such that the air permeability is set to a desired value. In the separator, plural microporous membranes may be laminated, or a heat resistance layer containing an inorganic filler (for example, alumina) may be formed on the surface thereof.

Figure 7:
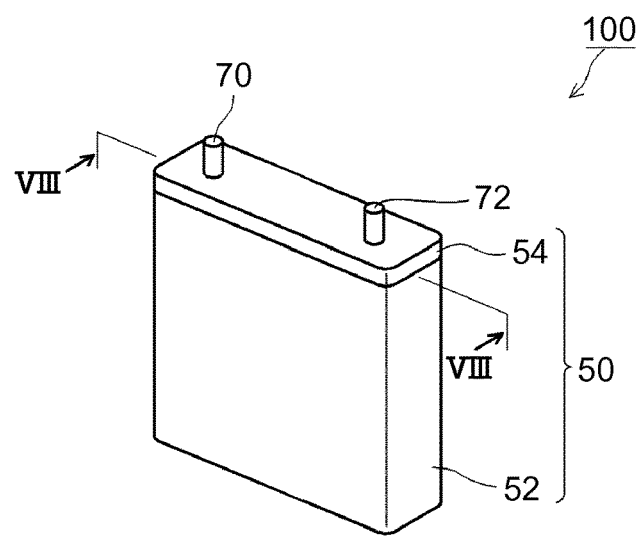
FIG. 7 is a schematic diagram showing a configuration example of a lithium ion secondary battery according to the embodiment of the present invention.

In the case insertion step S400, a battery case 50 shown in FIG. 7 is prepared. The battery case 50 includes a bottomed square case body 52 and a lid 54. The battery case 50 is formed of, for example, an Al alloy. A positive electrode terminal 70 and a negative electrode terminal 72 are provided on the lid 54.

Figure 8:
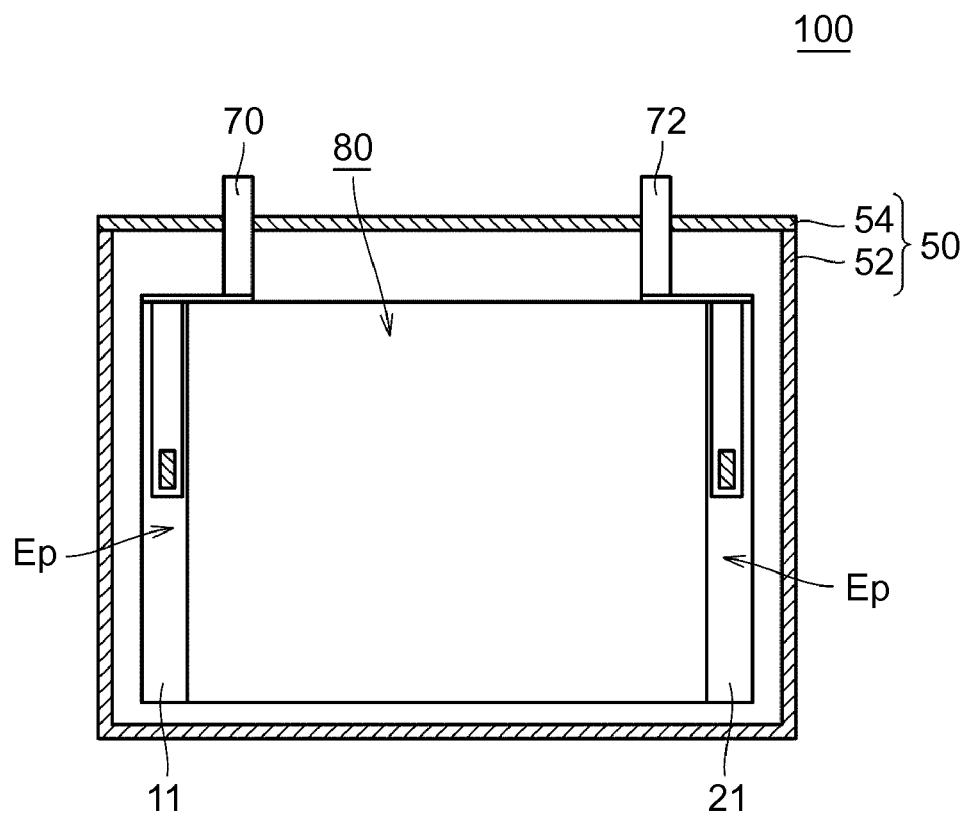
FIG. 8 is a schematic sectional view taken along line VIII-VIII of FIG. 7.

FIG. 8 is a schematic sectional view taken along line VIII-VIII of FIG. 7. As shown in FIG. 8, the exposure portion Ep (current collector foil 11) of the electrode body 80 on the positive electrode 10 side is electrically connected to the positive electrode terminal 70. Likewise, the exposure portion Ep (negative electrode current collector foil 21) on the negative electrode 20 side is electrically connected to the negative electrode terminal 72. Next, the electrode body 80 is inserted into the case body 52. The case body 52 and the lid 54 are joined to each other by, for example, laser welding.

In the liquid injection step S500, an electrolytic solution is injected into the battery case 50. For example, the electrolytic solution is injected through a liquid injection hole (not shown) provided on the battery case 50. After the injection, the liquid injection hole is sealed by predetermined sealing means.

The electrolytic solution is prepared by dissolving a Li salt in an aprotic solvent. Examples of the aprotic solvent which can be used include cyclic carbonates such as ethylene carbonate (EC), propylene carbonate (PC), butylene carbonate (BC), and γ-butyrolactone (γBL); and chain carbonates such as dimethyl carbonate (DMC), ethyl methyl carbonate (EMC), and diethyl carbonate (DEC). Among these aprotic solvents, a combination of two or more kinds is preferable from the viewpoints of electrical conductivity and electrochemical stability. In particular, a mixture of a cyclic carbonate and a chain carbonate is preferably used. At this time, a volume ratio of the cyclic carbonate to the chain carbonate is preferably about 1:9 to 5:5.

As the Li salt, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide ($Li(CF_3SO_2)_2N$), or lithium trifluoromethanesulfonate ($LiCF_3SO_3$) can be used. Among these Li salts, a combination of two or more kinds may be used. The concentration of the Li salt in the electrolytic solution is preferably about 0.5 mol/L to 2.0 mol/L.

As described above, a battery 100 shown in FIGS. 7 and 8 is manufactured. The embodiment has been described using the square battery as an example. However, the embodiment is not limited to the square battery. The embodiment may be applied to, for example, a cylindrical battery or a laminate battery. The electrode body is not limited to a wound electrode body. The electrode body may be a laminated (also referred to as "stacked") electrode group.

Hereinafter, the embodiment will be described in more detail using Examples. However, the embodiment is not limited to the following Examples.

Positive electrodes for a lithium ion secondary battery according to Samples A1 to A10 and Samples B1 to B6 were prepared as follows. Samples A1 to A10 correspond to Examples, and Samples B1 to B6 correspond to Comparative Examples.

Hereinafter, the preparation step S101 will be described using sample A1. In the preparation step S101, the following materials were prepared.

Current collector foil: A8021 foil having a thickness of 15 μm

Positive electrode active material: powder of $LiNi_{1/3}Co_{1/3}Mn_{1/3}O_2$ particles containing hollow particles having a tap density of 1.5 g/cm$^3$ Conductive material: acetylene black Binder: PVDF "A8021" described herein and "A1085" described below are foils having a chemical composition defined according to "JIS H 4160:2006 aluminum and aluminum alloy foils." "JIS H 4160" is defined by Japanese Industrial Standards. "A8021" is an Al alloy foil containing from 1.2 mass % to 1.7 mass % of Fe. "A1085" is a so-called pure Al foil.

In the granulation step S102, NMP was added to $LiNi_{1/3}Co_{1/3}Mn_{1/3}O_2$ (100 parts by mass), acetylene black (8 parts by mass), and PVDF (2 parts by mass), the components were mixed with each other using a planetary mixer to obtain a mixture, and the mixture was granulated. At this time, the solid content proportion was 75 mass %. As a result, a granulated body was obtained.

Next, the pressing step S103, the first arrangement step S104, the foil heating step S105, and the first drying step S106 will be described. The electrode preparation device 90 shown in FIG. 4 was prepared. As the C roller 93, a heat roller whose temperature can be adjusted was used. The temperature of the C roller 93 was set to 180° C., and the rotating speed of the C roller 93 was adjusted such that the contact time between the C roller 93 and the current collector foil 11 (second main surface 11b) was 2 seconds.

As shown in FIG. 4, the granulated body 4 was pressed in the gap between the A roller 91 and the B roller 92. As a result, the first positive electrode mixture layer 12a was obtained. Next, in the gap between the B roller 92 and the C roller 93, the first positive electrode mixture layer 12a was pressure-bonded to the first main surface 11a. During the pressure-bonding, the current collector foil 11 was heated by bringing the C roller 93 and the second main surface 11b into contact with each other. At this time, the maximum temperature of the first positive electrode mixture layer 12a was 160° C. or less. The first positive electrode mixture layer 12a was dried in a hot air drying furnace in which the hot air drying temperature was set as 150° C.

Next, the second arrangement step S107 and the second drying step S108 will be described. The second positive electrode mixture layer 12b was obtained using the same method as in the first positive electrode mixture layer 12a, except that the electrode preparation device 90 including the C roller 93 which was not heated was used. Next, the second positive electrode mixture layer 12b was pressure-bonded to the second main surface 11b. After drying the second positive electrode mixture layer 12b in a hot air drying furnace in which the hot air drying temperature was set as 150° C., the first positive electrode mixture layer 12a and the second positive electrode mixture layer 12b were pressed into a predetermined thickness and then were cut into a predetermined dimension. As a result, the positive electrode 10 according to Sample A1 was obtained. Preparation conditions of Sample A1 are shown in the table of FIG. 9.

Samples A2 to A6 were obtained using the same method as in Sample A1, except that the temperature of the heat roller and the contact time were changed as shown in FIG. 9.

Samples A7 to A9 were obtained using the same method as in Sample A4, except that the tap density of the positive electrode active material changed as shown in FIG. 9.

Sample A10 was obtained using the same method as in Sample A1, except that: the A1085 foil having a thickness of 15 μm was used as the current collector foil as shown in FIG. 9; and the temperature of the heat roller and the contact time were changed as shown in FIG. 9.

Sample B1 was obtained using the same method as in Sample A4, except that: the A1085 foil having a thickness of 15 μm was used as the current collector foil as shown in FIG. 9.

Sample B2 was obtained using the same method as in Sample A1, except that the temperature of the heat roller and the contact time were changed as shown in FIG. 9.

Sample B3 was obtained using the same method as in Sample A1, except that the heat roller was not used, that is, the foil heating step S105 was not performed.

Sample B4 was obtained using the same method as in Sample A1, except that the temperature of the heat roller and the contact time were changed as shown in FIG. 9.

Sample B5 was obtained using the same method as in Sample B3, except that the positive electrode mixture layer was dried in a hot air drying furnace in which the hot air drying temperature was set as 250° C.

Sample B6 was prepared under the same conditions as those of Sample A4, except for the following conditions. In the granulation step S102, a positive electrode mixture slurry having a solid content proportion of 52 mass % was prepared by increasing the amount of NMP. Using a die coater, the positive electrode mixture slurry was applied to the current collector foil (first main surface) to form a slurry coating film. In a state where this slurry coating film was formed on the first main surface, the heat roller and the second main surface were brought into contact with each other under conditions shown in FIG. 9. Next, the slurry coating film was dried in a hot air drying furnace to form a first positive electrode mixture layer. Further, the positive electrode mixture slurry was applied to the second main surface to form a second positive electrode mixture layer.

Using each of the samples, a lithium ion secondary battery for evaluation having a rated capacity of 4 Ah was prepared. The preparation procedure is as follows.

The negative electrode was prepared as shown in FIG. 5. Specifically, graphite (negative electrode active material), CMC (thickener), and SBR (binder) were kneaded with each other in water to prepare a negative electrode mixture slurry. This negative electrode mixture slurry was applied to both main surfaces of a Cu foil (negative electrode current collector foil 21). The slurry coating film was dried to form the negative electrode mixture layer 22. The negative electrode mixture layer 22 was pressed into a predetermined thickness. The negative electrode mixture layer 22 and the negative electrode current collector foil 21 were processed to have a predetermined dimension. As a result, the negative electrode 20 was prepared.

The assembly was performed as shown in FIGS. 6 and 8. Specifically, as shown in FIG. 6, the separators 40, the positive electrode 10, and the negative electrode 20 were wound to prepare the electrode body 80. As shown in FIG. 8, the electrode body 80 was inserted into the battery case 50. An electrolytic solution having the following composition was injected into the battery case 50, and then the inside of the battery case 50 was sealed.

$LiPF_6$: 1.0 mol/L

EC:DMC:EMC=3:4:3 (volume ratio)

The battery prepared using each of the samples was initially charged and discharged as follows. First, the battery was charged at a current value of 4 A until the voltage reached 4.1 V. Next, the battery was discharged at a current value of 4 A until the voltage reached 3.0 V.

Each of the samples and each of the batteries were evaluated as follows.

Migration index (MI) was measured as follows. The battery having a voltage of 3.0 V was disassembled to extract the positive electrode. The positive electrode was washed with EMC. Using the above-described method, a section of the sample was analyzed by SEM-EDX with F as an index to calculate MI. The results are shown in FIG. 9.

The percentage elongation after fracture of the current collector foil was measured as follows. First, the positive electrode mixture layer was peeled off from the washed positive electrode to extract the current collector foil. The current collector foil was cut into a rectangular test piece having a length of 60 mm and a width of 15 mm. This test piece was set in a fixture (chuck) of a tensile testing machine so as not to be loosened or deformed. The distance between two gauge points was set as 20 mm, the tension speed was set as 100 mm/min, and the test piece was stretched in a longitudinal direction thereof. At this time, the percentage elongation after fracture was calculated from the following expression (i):

$$(\text{Percentage Elongation after Fracture}) = \{(X1-X0) \div X0\} \times 100 \quad (i),$$

wherein X0 represents the distance between two gauge points when load started to be applied to the test piece, and X1 represents the distance between two gauge points when the test piece was fractured such that the applied load was released. The results are shown in FIG. 9.

The battery resistance was measured as follows. First, the battery was charged to 3.7 V. At 0° C., the battery was discharged at a current value of 5 A for 10 seconds. At this time, resistance was obtained based on polarization. This resistance was set as initial low-temperature resistance. Specifically, resistance R (Ω) was calculated from the following equation (ii) based on: a voltage drop amount ΔV (V) after 10 seconds from the start of discharging; and a current value of 5 (A). The results are shown in FIG. 9.

$$R(\Omega) = \Delta V(V) \div 5(A) \quad (ii)$$

According to the study by the present inventors, it is considered that an increase in resistance caused by repeated high-rate charging and discharging progresses as follows.

In high-rate charging and discharging, the expansion and shrinkage of the positive electrode active material and the positive electrode mixture layer containing the positive electrode active material becomes more severe than in normal-rate charging and discharging. At this time, the current collector foil is hard and cannot withstand the expansion and shrinkage of the positive electrode mixture layer. Therefore, strain or deformation occurs in the positive electrode mixture layer and the electrode body. As a result, the electrolytic solution which has been held in the electrode body in the initial stage is forced to flow to the outside of the electrode body.

Due to the deformation of the positive electrode mixture layer, a conductive network in the positive electrode mixture layer is cut, which increases battery resistance. When the resistance increases, the amount of heat generated by Joule heating due to high-rate charging and discharging increases. The temperature of the electrolytic solution increases due to Joule heating, and the electrolytic solution thermally expands. As a result, the electrolytic solution which cannot be held in the electrode body leaks to the outside of the electrode body.

As the amount of the electrolytic solution held in the electrode body decreases, the battery resistance further increases. As a result, Joule heating becomes more severe, which promotes the leakage of the electrolytic solution.

When a coating film formed of a slurry is dried, binder migration contributes to Joule heating. That is, when the coating film is dried, convection is generated in a solvent, and a binder migrates to the surface of the coating film together with the solvent. In a positive electrode mixture layer obtained as described above, the binder segregates on the surface thereof. As a result, on the surface of the positive electrode mixture layer, the diffusion of Li⁺ is inhibited, which promotes Joule heating.

In the positive electrode including the softened current collector foil according to the embodiment, the current collector foil can withstand the expansion and shrinkage of the positive electrode mixture layer. As a result, the strain and deformation in the positive electrode mixture layer and the electrode body can be suppressed. In addition, in the positive electrode, the positive electrode mixture layer is formed of the granulated body. As described above, in the granulated body, the amount of the solvent is small. Further, the migration range of the binder is limited to the inside of each of the granulated particles. Therefore, by adopting the granulated body, binder migration can be suppressed. Moreover, in this positive electrode, the melting of the binder can be suppressed.

In the positive electrode according to the embodiment, it is considered that the leakage of the electrolytic solution from the electrode body, and the thermal expansion of the electrolytic solution caused by Joule heating can be suppressed. That is, it is considered that an increase in resistance caused by repeated high-rate charging and discharging can be suppressed. In order to verify these assumptions, the battery resistance after high-rate cycles was measured.

At 25° C., 1000 charging-discharging cycles in which subsequent charging→first stop→discharging→second stop was set as one cycle were performed.

Charging: 80 A×30 seconds
First stop: 30 seconds
Discharging: 8 A×300 seconds
Second stop: 30 seconds After 1000 cycles, the battery resistance was measured as described above and set as a low-temperature resistance after high-rate cycles. The results are shown in FIG. 9.

Hereinafter, the experiment results and discussion regarding each of the samples will be described. In FIG. 9, in Samples A1 to A10, the percentage elongation after fracture of the current collector foil was high, and the initial resistance and the resistance after high-rate cycles were low. The reason for this result is considered to be as follows: in these samples, the current collector foil was softened, and binder migration and the melting of the binder were able to be suppressed. That is, since binder migration and the melting of the binder were suppressed, the thermal expansion of the electrolytic solution was suppressed. Further, since the softened current collector foil was able to withstand the expansion and shrinkage of the positive electrode mixture layer, the deformation of the positive electrode mixture layer and the electrode body was suppressed. As a result, the leakage of the electrolytic solution from the electrode body was suppressed. It is considered that, as a result of a combination of the above factors, an increase in resistance after high-rate cycles was able to be suppressed.

It was found from Samples A4 and A7 to A9 that, when the tap density of the positive electrode active material is within a range of 1.2 g/cm³ to 1.9 g/cm³, the effect of suppressing an increase in resistance is high.

In Sample B1, the percentage elongation after fracture was lower than that in Sample A10. Accordingly, it is considered that, in Sample B1, the current collector foil was not able to be heated to a softening point or higher. As a result, in Sample B1, the current collector foil was not able to withstand the expansion and shrinkage of the positive electrode mixture layer, and the resistance after high-rate cycles was high.

It was found from the result of Sample B3 that even the low-temperature softening Al foil (A8021) is not softened by hot air drying at 150° C. In Sample B2, the foil heating step S105 was performed using the heat roller, but the percentage elongation after fracture was low. The reason for this result is considered to be as follows: since the amount of heat in the foil heating step S105 was small, the current collector foil was not able to be heated to softening point or higher.

In Samples B4 and B5, the current collector foil was able to be softened, but an increase in resistance was not able to be suppressed. The reason for this result is considered to be as follows: since the amount of heat applied to the positive electrode mixture layer was large, the temperature of the positive electrode mixture layer was increased to the melting point of the binder or higher.

In Sample B6 in which the slurry was used, binder migration was severe, and the value of MI was high. As a result, an increase in resistance after high-rate cycles was promoted.

Hereinabove, the embodiment and Examples of the present invention have been described. However, the present invention is not limited to the embodiment and the Examples. The embodiment and the Examples may be appropriately changed or combined with each other.

What is claimed is:

1. A method of manufacturing a positive electrode for a lithium ion secondary battery, the method comprising:
   preparing a current collector foil having a first main surface and a second main surface that are opposite sides of the current collector foil;
   obtaining a granulated body in which a solvent remains by mixing a positive electrode active material, a conductive material, a binder, and the solvent with each other to obtain a mixture and granulating the mixture to obtain the granulated body having a solid content proportion of 70 mass % to 80 mass %;
   obtaining a first positive electrode mixture layer by pressing the granulated body into a sheet shape;
   arranging the first positive electrode mixture layer on the first main surface; and
   heating the current collector foil in a state where the first positive electrode mixture layer containing the granulated body is arranged on the first main surface, such that a temperature of the current collector foil becomes a softening point of the current collector foil or higher and that a temperature of the first positive electrode mixture layer is lower than a melting point of the binder.

2. The method of manufacturing a positive electrode for a lithium ion secondary battery according to claim 1, wherein
   the current collector foil is an aluminum alloy foil containing from 1.2 mass % to 1.7 mass % of iron.

3. The method of manufacturing a positive electrode for a lithium ion secondary battery according to claim 1, wherein
   during the heating of the current collector foil, a heated roller and the second main surface are brought into contact with each other.

4. The method of manufacturing a positive electrode for a lithium ion secondary battery according to claim 3, wherein
   during the heating of the current collector foil, a temperature of the roller is from 200° C. to 400° C.

5. The method of manufacturing a positive electrode for a lithium ion secondary battery according to claim 3, wherein during the heating of the current collector foil, a contact time between the roller and the second main surface is from 0.05 seconds to 2.0 seconds.

6. The method of manufacturing a positive electrode for a lithium ion secondary battery according to claim 1, wherein a tap density of the positive electrode active material is from 1.2 g/cm$^3$ to 1.9 g/cm$^3$.

7. The method of manufacturing a positive electrode for a lithium ion secondary battery according to claim 1, further comprising arranging a second positive electrode mixture layer on the second main surface after the heating of the current collector foil.

* * * * *